Dec. 11, 1928.

H. H. VICKERS 1,694,932

COMBINED TYPEWRITING AND COMPUTING MACHINE

Original Filed Sept. 8, 1923

Inventor:
Harry H. Vickers
by B. C. Stickney
Attorney

Patented Dec. 11, 1928.

1,694,932

UNITED STATES PATENT OFFICE.

HARRY H. VICKERS, OF CORONA, NEW YORK, ASSIGNOR, BY MESNE ASSIGNMENTS, TO ELLIOTT-FISHER COMPANY, OF NEW YORK, N. Y., A CORPORATION OF DELAWARE.

COMBINED TYPEWRITING AND COMPUTING MACHINE.

Original application filed September 8, 1923, Serial No. 661,540. Divided and this application filed March 29, 1926. Serial No. 98,130.

This invention relates to improvements in combined typewriting and computing machines, and is illustrated as applied to an Underwood bookkeeping machine, one form of which is shown in the patent to Frederick A. Hart, No. 1,270,411, dated June 25, 1918.

In posting accounts on ledger-sheets, it is customary to insert in the bookkeeping machine a ledger-sheet corresponding to a customer's account and displaying in a balance column the old balance, showing the condition of the account at the end of the last posting. Such old balance is typed in an old-balance column on the ledger-sheet and run into a computing register and into a proving register. The amounts of the debits and credits are then typed in the proper columns and are concomitantly added or subtracted in the computing register to determine a new balance. No change in the proving register results from such typing of the debit and credit entries. The new balance displayed in the computing register is then typed in the balance column and concomitantly subtracted out of or added into the computing register, in accordance with the positive or negative character of said balance, thereby clearing the computing register. The star-key (see patent to Frederick A. Hart, No. 1,190,287, dated July 11, 1916, may then be operated to type a star, to show that the computing register stands at "0."

The ledger-sheet is also provided with a proof column, preferably located adjacent the right edge of the sheet, and, upon completion of the posting of an account, the old balance is typed in the proof column and subtracted from the proving register. This operation should clear the proving register, and, if the old balance is copied from the balance of the last posting, such clearing of the proving register indicates that the old balance was correctly copied at the beginning of the new posting.

According to the present embodiment of the invention, provision is made of a collating table on which may be positioned a ledger-sheet, and also, if desired, a similar statement-sheet superposed on the ledger-sheet and having substantially the same arrangement of columns as the ledger-sheet; and of tally-strip mechanism to feed around the platen a tally-strip of which a portion exposed at one side of the ledger-sheet may be used as a proof column. Preferably the tally-strip is of sufficient width to receive carbon-copies of the entries in the debits and credits columns. The feature of using a portion of the tally-strip as a proof column permits the omission of the proof column on the ledger-sheet, and, consequently, on the statement-sheet which usually has the same arrangement of columns as the ledger-sheet. The proof column on both ledger-sheet and statement-sheet is thus rendered unnecessary and, in the case of the statement-sheet, is especially objectionable, in that the entries in the proof column are of no value to the customer and merely tend to confuse him. Heretofore, it has been proposed to provide the statement-sheet with a line of perforations, between the proof column and the balance column, to permit the proof column to be torn off and discarded. This practice is objectionable due to the waste of paper and of the time required to detach such proof column. Obviously, this objectionable feature is avoided by the present arrangement.

This application is a division of my application, Serial No. 661,540, filed September 8, 1923 (now Patent No. 1,600,023, dated September 14, 1926).

Other features and advantages will hereinafter appear.

In the accompanying drawings.

Figure 1:
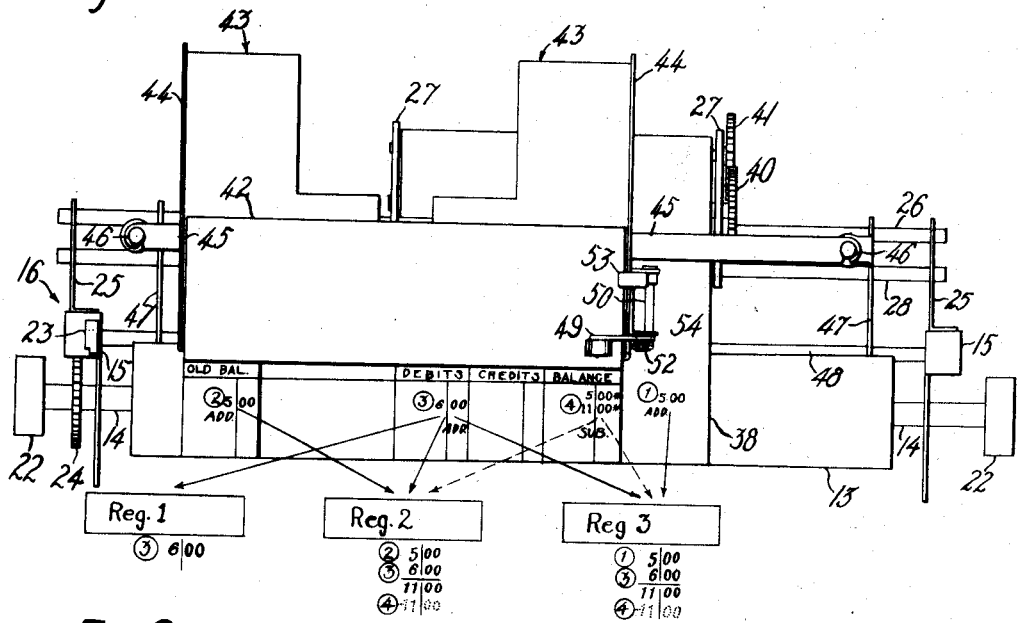
Figure 1 is a front elevation of a portion of an Underwood bookkeeping machine, illustrating one form of the invention; the manner in which the entries are run into the various registers being shown diagrammatically.
Figure 2:
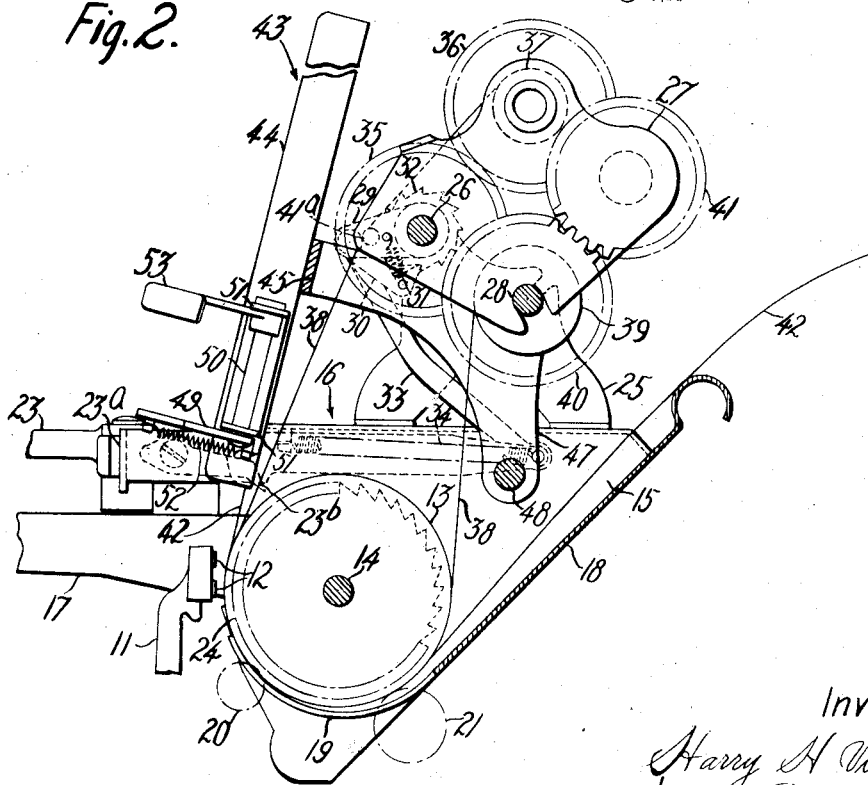
Figure 2 is a side elevation, partly in section, of substantially the same structure as shown in Figure 1.

Upon depression of type-keys (not shown), type-bars 11 are swung upwardly and rearwardly to cause types 12 to print on a platen 13, journaled by means of an axle 14 in the ends 15 of a platen-frame 16, mounted in a traveling carriage 17. The carriage is provided with a usual rear paper-table 18, a paper-apron 19 extending around the bottom of the platen, and front and rear feed-rolls 20 and 21, respectively co-operating with the platen at the bottom thereof. The platen may be rotated either by finger-wheels 22 at the opposite ends of the axle or by line-space mechanism, comprising a line-space lever 23, a line-space slide 23ª, a pawl 23ᵇ and a ratchet-wheel 24 fixed on the platen-axle.

Mounted on the ends of the platen-frame are brackets 25, in which is journaled a transverse shaft 26 for driving suitable tally-strip mechanism. Said shaft 26 is also journaled in end plates 27 of the tally-strip mechanism and assists in supporting the same. The plates 27 of the tally-strip mechanism are also supported by means of a rod 28, detachably mounted in the brackets 25. To actuate the shaft provision is made of an arm 29, loosely mounted thereon, near its left end, and of a pawl 30 pivoted on the arm and urged by a spring 31 into engagement with a ratchet-wheel 32, fixed on shaft 26, the arm being pivotally connected at its outer end with a link 33, also connected to the line-space slide 23ª, so that, upon movement of the latter rearwardly against the action of a spring 34, the shaft 26 is advanced one step. Upon such actuation of the shaft, a gear 35 thereon acts to rotate a second gear 36 connected with a reel 37 to wind up a tally-strip 38 as the platen is line-spaced. The tally-strip is drawn from a spool 39, loosely mounted on the rod 28, for supporting the plates 27, and having fixed thereto a gear 40 meshing with a gear 41 connected with a brake-device (not shown), so as to resist the advance of the tally-strip around the platen and over a guide 41ª to the reel 37. The tally-strip mechanism may be substantially the same as that disclosed in the patent to Frederick A. Hart, No. 1,281,160, dated October 8, 1918.

For use in connection with a ledger-sheet 42, and, if desired, with a statement-sheet (not shown), a collating table 43, having fixed edge gages 44, is mounted at the delivery side of the platen, by means of a transverse bar 45, having slotted ends to engage with headed studs 46 mounted on brackets 47 supported by a transverse rod 48 connecting the ends of the platen-frame, and by the shaft 26 and rod 28. The table 43 may comprise two separate end portions suitably attached to said bar 45. Provision is also made of a clamping finger 49, fixed on a shaft 50, journaled in brackets 51, on the right-hand edge gage of the table, so that the clamping finger may be swung into and out of engagement with the table, provision being made for a spring 52, so connected to the finger and to the bracket as to hold the clamping finger either in effective or ineffective position when moved thereto. The clamping finger may be swung from either position to the other by means of a finger-piece 53, fixed on the shaft 50.

As herein disclosed, the ledger-sheet 42 is provided with an old-balance column, a debits column, a credits column and a balance column, the usual proof column being omitted, for reasons hereinbefore stated, so that the items usually entered therein may be typed on the exposed portion 54 of the tally-strip 38 which is also wide enough to receive copies of the entries in the debits, credits and balance columns. As shown diagrammatically in Figure 1, the bookkeeping machine is so set that an entry (1) on the exposed portion of the tally-strip mechanism is run into a proving register herein referred to as register 3; an entry (2) in the old-balance column is run into a register referred to as register 2; an entry (3) in the debits column is run into registers 2 and 3, and also into an accumulating register referred to as register 1; and an entry (4) in the balance column is subtracted out of registers 2 and 3 if such entry is positive. It will be seen that for convenience the entries are so numbered on Figure 1 as to indicate the order in which they are made.

An example of the invention is given in Figure 1. A ledger-sheet 42, corresponding to the account of a customer, is adjusted on the paper-table 43, as shown in Figure 1, and the balance 5.00 shown in the balance column is typed on the exposed portion 54 of the tally-strip 38 and concomitantly run into the proving register 3. The platen is then line-spaced and the carriage moved to the right, by actuation of the line-space lever 23, to make an entry in the old-balance column. The old balance 5.00 is typed in the old-balance column and run into the computing register; the debit item 6.00 is typed in the debit column and run into registers 1, 2 and 3; and the result shown in register 2 is then typed in the balance column and subtracted in both registers 2 and 3, clearing register 2 and also register 3 if the entry in the old-balance column is the same as the entry in the proof column. Failure to clear register 3 shows that the entries made on the tally-strip and in the old-balance column do not agree. In this connection, it should be understood that usually a statement-sheet is prepared concomitantly with the posting on the ledger-sheet.

The result in the accumulating register 1 at the end of the operation of posting a plurality of ledger-sheets may be used for comparison with the summation of the debits and credits obtained by another operator. If the results do not agree reference may be made to the tally-strip to check the debit and credit entries.

As in said Hart Patent, No. 1,281,160, the feed-rolls 20, 21 are used only for advancing the ledger and bill sheets, while the tally-strip 38 moves at a differential speed from the platen 13, this result being secured by the pawl-and-ratchet train running from the line-space handle 23 to the winding spool, and including parts 29—32. By means of the collating table 43 at the delivery side of the platen, the usual bill or statement sheet is collated over the ledger-sheet 42, and both are collated over the tally-strip, leaving the right-hand old-balance zone upon the latter exposed, so that the old balances will not be typed upon the ledger or the bill, although the typing is done upon the composite work-sheet 42, 38 in the same manner as if the sheet 42 entirely covered the sheet 38. The bill and ledger sheet are hence simpler to understand, but the advantages of the use of the three registers are preserved. The tally-strip is cleared by the platen feed-rolls, so as to permit the differential movement of the tally-strip and the platen, as set forth in said Patent No. 1,281,160. By using clamp 49 the ledger-sheet may be detained in position while the usual bill-sheet with its usual carbon is collated over the ledger-sheet between the side guides 44 upon the table 43, thus making an ink-ribbon copy of the charge to be sent to the customer, while the ledger-page contains a carbon-copy of the charge. The ledger-sheet is long and is gradually filled up as successive bills are typed. Each bill is relatively short, and is collated over the ledger-sheet while the latter is temporarily retained by the clip 49.

Variations may be resorted to within the scope of the invention, and portions of the improvements may be used without others.

Having thus described my invention, I claim:

1. In a combined typewriting and computing machine having a platen and a series of computing registers, the combination with means for guiding a tally-strip around the platen, of means for collating a bill or statement sheet upon a ledger-sheet and both upon a tally-strip with a computing zone of the tally-strip exposed at one side of the bill and ledger sheets, for receiving the type-impressions of the old balances, said collating means including a bill and ledger-sheet collating table mounted at the delivery side of the platen over the tally-strip and offset relatively to the tally-strip-guiding mechanism to permit the typing of each line of items at the combined typing and computing operation without having the old-balance items appear twice upon the bill and ledger sheets.

2. In a combined typewriting and computing machine having a platen, a carriage therefor and a plurality of registers for computing and proving the entries made upon a statement and a ledger sheet, two of said registers being arranged to receive separately the old balance twice typed by the operator, once for computing the new balance and once for proving the first entry thereof, the combination of a statement and ledger sheet collating table, and a tally-strip mechanism arranged to feed and guide a tally-strip around the platen at the rear of said sheets so as partially to underlie the same and partially extend beyond a side edge of said sheets to provide a computing zone at one side to receive the proving old balance entries, but terminating, at its other side, short of the corresponding side of said statement and ledger sheets, whereby the old balance is typed once on said statement and ledger sheets and once on said tally-strip, and a proving column of duplicate old balance entries on said statement and ledger sheets is rendered unnecessary.

3. In a combined typewriting and computing machine for posting entries on ledger and statement sheets having a single old balance column, debits and credits columns and a new balance column, said machine having a platen, a carriage therefor and a plurality of computing registers, two of said registers being arranged to receive separately the old balance twice typed by the operator, once for computing the new balance and once for proving the first entry thereof, the combination of a collating table, and means co-operating therewith to collate a record-sheet to receive the second column of old balance entries, said last-mentioned means including a tally-strip mechanism offset relatively to said table longitudinally of the platen and arranged to feed and guide a tally-strip around the platen at the rear of said sheets in such manner that said strip partially underlies said statement and ledger sheets to have the debits, credits and new balance entries manifolded thereon and extending beyond one edge of said sheets to provide a computing zone to receive the proving old balance entries, whereby a proving column of duplicate old balance entries on said statement and ledger sheets is rendered unnecessary, and an old balance entry appears only once on said statement, ledger and tally sheets.

4. In a combined typewriting and computing machine having a platen, a carriage therefor and a plurality of registers for computing and proving the entries made upon a statement and a ledger sheet, two of said registers being arranged to receive separately the old balance twice typed by the operator, once for computing the new balance and once for proving the first entry thereof, the combination of a statement and ledger sheet collating table, and means for guiding a record-sheet around said platen at the rear of said statement and ledger sheets in such manner as to provide a column on said record-sheet extending beyond one side edge of said statement and ledger sheets to receive the proving old balance entries, whereby a proving old balance column on said statement and ledger sheets is rendered unnecessary.

HARRY H. VICKERS.